United States Patent [19]

Fotheringham

[11] Patent Number: 5,013,131
[45] Date of Patent: May 7, 1991

[54] SINGLE-MODE OPTICAL, FIBER AND PROCESS FOR ITS PRODUCTION

[75] Inventor: Ulrich Fotheringham, Wiesbaden, Fed. Rep. of Germany

[73] Assignee: Schott Glaswerke, Mainz, Fed. Rep. of Germany

[21] Appl. No.: 337,205

[22] Filed: Apr. 12, 1989

[30] Foreign Application Priority Data

Apr. 12, 1988 [DE] Fed. Rep. of Germany ....... 3812140

[51] Int. Cl.$^5$ .......................... G02B 6/18; C03C 25/02
[52] U.S. Cl. ............................... 350/96.31; 350/96.33; 350/96.34; 350/96.30; 350/320; 65/3.11
[58] Field of Search ............... 350/96.29, 96.30, 96.31, 350/96.33, 96.34, 320; 65/3.11, 3.12

[56] References Cited

U.S. PATENT DOCUMENTS

| | | | |
|---|---|---|---|
| 4,149,772 | 4/1979 | Iyengar et al. | 350/96.33 |
| 4,435,040 | 3/1984 | Cohen et al. | 350/96.33 |
| 4,439,007 | 3/1984 | Lazay et al. | 350/96.30 |
| 4,715,679 | 12/1987 | Bhagavatula | 350/96.33 |
| 4,755,022 | 7/1988 | Ohashi et al. | 350/96.33 |
| 4,770,492 | 9/1988 | Levin et al. | 350/96.29 |
| 4,852,968 | 8/1989 | Reed | 350/96.33 |
| 4,893,896 | 1/1990 | Tanaka et al. | 350/96.31 |
| 4,919,504 | 4/1990 | Colas et al. | 350/96.31 X |

FOREIGN PATENT DOCUMENTS

3232194A1 3/1983 Fed. Rep. of Germany ... 350/96.33 X
2116744 9/1983 United Kingdom ............. 350/96.33

OTHER PUBLICATIONS

Cohen et al., "Los Loss Quadruple-Clad Single-Mode Lightguides with ...," Electronic Letters, vol. 18, No. 24, 1982, pp. 1023-1024.
Francois et al., "Multimode Nature of Quadruple-Clad Fibers," Electronic Letters, vol. 20, No. 1, 1984, pp. 37-38.

Primary Examiner—Brian Healy
Attorney, Agent, or Firm—Millen, White & Zelano

[57] ABSTRACT

A single-mode optical fiber is doped to achieve a number of desired properties and have a refractive index profile n(r). The doped fiber must at least approximate the formula:

$$\sum_{i=1}^{m} |n(r_i) - n_o| \cdot r_i \cdot \Delta r = \text{Minimum}$$

in which $n_o$ means the refractive index of the matrix material and $r_i = i \cdot \Delta r$. A process for the production of the single-mode optical fiber is disclosed using at least 100 layers.

19 Claims, 8 Drawing Sheets

Fig. 6

SINGLE-MODE OPTICAL, FIBER AND PROCESS FOR ITS PRODUCTION

The invention relates to a single-mode optical fiber with a refractive index profile n(r), in which n means the refractive index of the fiber material at a distance r from the axis of the fiber. The refractive index profile is preferably adjusted by doping of the matrix material from which the fiber is predominantly made with at least one dopant, which results in the formation of a number of layers with different refractive indices. The invention also relates to a process for its production.

A single-mode fiber with a refractive index profile is known from DE-OS 32 32 194, which is designed so that the fiber meets three special conditions with respect to the chromatic dispersion: there are zero positions at two preselected wavelengths and there is also a preset maximum value. The refractive index profile is made from three layers and is shaped like the letter W. It is not optimized relative to the amount of dopant.

SUMMARY OF THE INVENTION

An object of the invention is to provide a single-mode optical fiber which has the least possible amount of dopant for the preselected properties.

Another object of the invention is to provide a process for the production of such an optical fiber.

These objects are attained according to the invention by a single-mode optical fiber characterized in that its refractive index profile n(r) is adjusted for preset values of desired properties such as the chromatic dispersion and/or the mode field diameter and/or the attenuation and/or the overmode cutoff. The number m of layers of thickness $\Delta r$ is greater than the number of desired properties, and each layer contains exactly an amount of dopant so that the relative refractive indices, while maintaining the desired properties, approximately and preferably and substantially meet the condition $$\sum_{i=1}^{m} |n(r_i) - n_o|\neg r_i \cdot \Delta r = \text{Minimum} \quad (1)$$

in which $n_o$ means the refractive index of the matrix material and $r_i = i \cdot \Delta r$.

To meet the conditions according to formula 1 above means that the amount of dopant must be minimized. Thus, there is a corresponding reduction of the production costs since with the usual concentrations of dopant the resulting difference of the refractive index from the undoped material is essentially proportional to the concentration of the dopant. This applies to the conventional dopants at least approximately even if several different dopants are present, especially a dopant increasing the refractive index and a dopant lowering the refractive index. Under such circumstances, meeting the conditions according to the invention may be achieved by minimizing the amount of dopant, especially if the effects of each of the two dopants on the refractive index are essentially equal but acting in opposite directions. This is especially the case with the frequently used dopants fluorine (for lowering the refractive index) and germanium (for raising the refractive index). The proportionality factor between refractive index change and the number of particles introduced per mole of matrix material are almost identical for fluorine and germanium.

In modern production processes, the fiber is built up from a number of layers and there may be a change in the refractive index in the layers. Meeting of the requirements according to the invention can be achieved with a considerable number of desired properties without unnecessarily large jumps in the refractive index and without excessive deviation from the refractive index of the matrix material because the number of layers is selected to be great in comparison with the number of desired properties. This is possible, for example, in the known plasma production processes in which the number of possible layers and thus the number of the degrees of freedom available for the design of the fiber according to the invention has increased to about 1,000 (PCVD process), or even 1,000,000 (PICVD process) To simplify the calculation of the necessary refractive index profile, a smaller number of layers going into the calculation may be selected. Generally, it suffices if, in the production, more than 100 layers, preferably from about 300 to 500 layers, are selected.

The following properties are especially suitable as desired properties of the optical fiber:

(a) The chromatic dispersion has zero positions approximately at the light wavelengths 1,300 and 1,550 nm (these are the preferred operating wavelengths, since the usual CVD glass material absorption minima are present there), and a maximum of 3 ps/(nm.km) at the midpoint between the zero positions. This means a flattened shape of the dispersion corresponding more closely to international recommendations.

(b) The attenuation of the $LP_{11}$ mode taken as the first overmode at 1,250 nm is at least 1 dB/m. This is suitable for operation of the fiber effectively in a single mode from this wavelength onward.

(c) Attenuation of the fundamental mode at 1,600 nm is at most $10^{-6}$ dB/km. This still leaves enough clearance for attenuation increases by fiber bendings.

(d) The mode field diameter at 1,300 nm is as great as possible and is, e.g., 6.8 microns. This facilitates splicing.

(e) The refractive index is not to fall below a preset minimum value.

The fiber according to the invention represents a multiclad fiber, which along its radius exhibits a characteristic sequence of almost triangular peaks and valleys with intervening flat zones and coarse structures. For example, a first strongly pronounced refractive index minimum follows a core of relatively high refractive index, a pronounced first refractive index maximum follows it, a weak second minimum, and a terminal segment. See, e.g., EP-OS-0224282. According to the invention, a second maximum is also present on the outside edge of the core. This makes it possible to raise, preferably to zero, the chromatic dispersion at about 1,300 nm and eliminate the undesired high negative value of the chromatic dispersion as found in conventional fibers. There are several inflection points between the first maximum and the second minimum. The drop of the refractive index from the first maximum to the second minimum can be accomplished more economically by minimizing the amount of dopant present. This can be achieved, for example, by using a layer of undoped matrix material, preferably $SiO_2$, between the first maximum and the second minimum.

Preferably, a third maximum is provided in the terminal segment in which the refractive index preferably is at the level of undoped matrix material. This causes an increase of the tunneling probability for the LP photons from the core into the material lying further out, and influencing the overmode cutoff, i.e., an increase of the overmode attenuation. This third maximum is so far removed from the core of the fiber that it no longer disturbs the fundamental mode with respect to attenuation and dispersion.

Refractive index profiles for the fibers according to the invention can be determined mathematically with little effort. A simplified approach to such a mathematical determination is described in greater detail below.

For a given number l of desired properties, e.g., with respect to dispersion, attenuation, mode field diameter, and overmode cutoff, the condition according to the invention formulated mathematically where a minimum is sought is as follows:

$$\sum_{i=1}^{m} |n(r_i) - n_o| \cdot r_i \cdot \Delta r_i \, r_i < i \cdot \Delta r \tag{1}$$

where the l desired properties, as secondary conditions, define the admissible region in $R^m$, the space of refractive indices $n(r_i) - n_o$. In this way, it is possible to work with a quasi-continuous profile, e.g., some hundreds of equidistant layers. Mathematically, this sum represents an approximation of the following integral:

$$\int_o^{R_2} |n(r) - n_o| r dr \tag{2}$$

which $R_2$ means the radius of the fiber.

Let the following typical properties for a fiber with a diameter of $2 \cdot R_2 = 125$ microns diameter be taken as an example: The chromatic dispersion is to have two zero positions at 1,300 and 1,550 nm with a maximum of 3 ps/nm.km midway between the zero positions. The attenuation of the $LP_{11}$ mode, taken as the first overmode, is 1 dB/m at 1,250 nm to enable operation of the fiber effectively in a single mode from this wavelength on. The fiber also is to have an attenuation of $10^{-6}$ dB/km at 1,600 nm for a fundamental mode ($LP_{01}$) which will permit fiber bending without exceeding the permissible limits of the attenuation specification. The mode field diameter is to be 6.8 microns at 1,300 nm.

Calculation of the related fiber with the refractive index profile according to the invention takes place in two steps. First, starting from a step index profile slightly rounded off, an element of the admissible region is found with a Newton-type process, i.e., a refractive index profile, with which the desired properties result except for the minimizing condition. Then, the minimum is reached with the method of the steepest descent.

The summation norm of formula (1) above is convex over $R^m$. Therefore, a local minimum under "mild" secondary conditions is at the same time an overall minimum (convex optimization). The presence of convex optimizing is shown by the fact that if differently structured initial profiles are selected as a basis, the minimum is unaffected.

The Newton-type process is explained below.

Since a solution can be expected in the region of poorly conducting fibers, the calculation below is performed using the scalar wave equation and linearly polarized modes.

As mentioned above, the calculation of the initial fiber design is made using a simple step index profile for the core and cladding. In this example, the cladding can consist of pure quartz glass ($SiO_2$). The refractive index profile can be described by vector $\vec{n}$ comprising the refractive indices of the individual layers. Corresponding to the Newton method, the (generally nonlinear) secondary conditions are linearized locally as follows:

$$c_j(\vec{n_2})\nabla c_j(\vec{n_\Lambda}) + \approx _ n c_j(\vec{n_2} - \vec{n}_\Lambda) \tag{3}$$
$$j = \Lambda, \ldots, l$$

If the secondary conditions are evaluated at point $n_1$, the residual vector is obtained having the components $$b_j = c_j(\vec{n}_\Lambda) - c_{jo} \tag{4}$$

where $c_{jo}$ is the set point of the desired property.

A matrix M having rows containing the gradients of the secondary conditions can be used to formulate the requirements on the vector $\Delta\vec{n} = \vec{n_2} - \vec{n_1}$:

$$m \cdot \Delta \vec{n} = -\vec{b} \tag{5}$$

At the same time $\Delta\vec{n}$ is required to be minimal relative to $L_2$ norm. Thus, where $\vec{\alpha}$ is the vector containing the Lagrange multipliers:

$$\alpha \cdot \Delta \vec{n} + M^T \vec{\mu} = 0 \tag{6}$$

Multiplication of this equation with M and substitution leads to $$\vec{\mu} = (M M^T)^{-\Lambda} 2 \vec{b} \tag{7}$$

which is calculated by means of the Householder method. Thus, there is obtained:

$$\Delta \vec{n} = -M^T(M M^T)^{-\Lambda} \vec{b} \tag{8}$$

Generally, the admissible region will be reached after a few iterations of this kind.

For this Newton-type process, calculations of the physical properties from the refractive index profile are necessary in addition to the calculations of the derivatives of the mathematical functions embodying these properties according to the refractive indices of the individual layers.

The chromatic dispersion is calculated by numerical differentiation of the group delay time, and modal field and mode propagation constant are determined numerically, e.g., according to U. Fotheringham, D. Krause, R. Kunstmann, "Calculations to Determine the Effective Cutoff Wavelength of Single-Mode Fibers," J. Opt. Commun. 8, 4, pp. 143-147, 1987, and A. W. Snyder, J. D. Love, "Optical Waveguide Theory," London, N.Y.: Chapman and Hall, 1983."

The calculation of the gradient of the chromatic dispersion begins from the perturbation correction of the first order, which results for the longitudinal propagation constant $\Lambda$ in the case of the transition $\vec{n} \rightarrow \vec{n} + \Delta \vec{n}$. The integral equation for this expression is $$\Delta \rho = k \cdot \int_o^{R_2} E^2(r_1\lambda) \cdot \Delta n(r) \cdot r dr \tag{9}$$

where
$E(r)$ is the field function,
$\lambda$ is the wavelength, and $$k = \frac{2\pi}{\lambda}$$

For the chromatic dispersion:

$$C(\lambda) = \frac{\partial}{\partial \lambda} \frac{-\lambda^2}{2\pi \cdot C} \frac{\partial}{\partial \lambda} \beta(\lambda) \quad (10)$$

Applying the Schwarz theorem, $$\Delta C(\lambda) = -\frac{\lambda}{C} \int_0^{R_2} \left[ \left( \frac{\partial E}{\partial \lambda}(r_1 \lambda) \right)^2 + E(r_1 \lambda) \cdot \frac{\partial^2 E}{\partial \lambda^2}(r_1 \lambda) \right] \Delta n(r) \cdot r dr \quad (11)$$

The refractive index profile change $\Delta n(r)$ is assumed to be independent of wave length. The initial refractive index profile is not assumed to be independent of wavelength but is calculated for each wavelength from the concentration profile of the dopants. This concentration profile, for its part, is recalculated in each iteration step. There results for the gradient the following expression:

$$\frac{\partial C(\lambda)}{\partial n_k} = -\frac{\lambda}{C} \left[ \left( \frac{\partial E}{\partial \lambda}(r_{k1}\lambda) \right)^2 + E(r_{k1}\lambda) \frac{\partial^2 E}{\partial \lambda^2}(r_{k1}\lambda) \right] \cdot r_k \cdot \Delta r \quad (12)$$

where $n(r_k)$ is indicated as $n_k$.

(2) The attenuation of the $LP_{01}$ and $LP_{11}$ mode is calculated according to the work of Fotheringham et.al., supra. Thus, the loss per length is indicated by the expression $$\frac{k_{r1} inf}{2\beta(R_1 - R_0)} \frac{E^2(R_2) \cdot R_2}{E^2(R_1) \cdot R_1} \quad (13)$$

For this invention, the ratio (calculated these according to the WKB method (cf., e.g., H. G. Under, "Optische Nachrichtentechnik," Part I, Heidelberg (1984) 92)) of the square of the field amplitude weighted by the fiber radius $r_2$ to the square of the field radius weighted by the actual core radius $r_1$ is calculated by a numerical field calculation. The internal caustic is indicated by $r_0$, $k_{r, inf}$ is the radial component of the wave number in the medium surrounding the fiber.

The essential spectral dependence of this attenuation expression is contained in the ratio of the amplitude squares. Therefore in the formation of the gradient, $R_0$ and $R_1$, as well as $\mu$, are considered constant in good approximation, so that only the derivatives of the field at point $R_1$ according to the individual refractive indices are needed. To achieve these, the scalar wave equation is differentiated and thus a nonhomogeneous differential equation for the desired derivative of the field function is obtained:

$$\frac{\partial}{\partial n_k} \left( \frac{\partial^2}{\partial r^2} + \frac{1}{r} \frac{\partial}{\partial r} - \frac{v^2}{r^2} + n^2(r)k^2 - \beta^2 \right) E = 0 \rightarrow \quad (14)$$

$$\left( \frac{\partial^2}{\partial r^2} + \frac{1}{r} \frac{\partial}{\partial r} + n^2(r)k^2 - \beta^2 - \frac{v^2}{r^2} \right) \frac{\partial E}{\partial n_k} \bigg|_{r=rl} +$$

$$\left( 2n(r_l)\delta_{lk} - 2\beta \frac{\partial \beta}{\partial n_k} \right) E \bigg|_{r=rl} = 0$$

$v = 0 \; fur \; LP_{01}$
$v = 1 \; fur \; LP_{11}$

In this case, all differential quotients are to be understood as difference quotients. Since all m derivative functions can be obtained with one step using conventional calculation procedures, these equations are solved using the method of the variation of constants.

The attenuation calculations are used for determination of the fundamental mode attenuation (see c above) and the determination of the overmode attenuation (overmode cutoff, see b above).

(3) For mode field diameter $w_0$, the $1/e$ definition is used here, i.e., $E(w_0)/E(0) = 1/e$. By changing the refractive index $n_k$, $w_0$ changes to $w_0 + \Delta w_0$ and in a first approximation, the following holds:

$$\frac{E(w_0) + \frac{\partial E}{\partial r}\bigg|_{w_0} \Delta w_0 + \frac{\partial E}{\partial n_k}\bigg|_{w_0} \Delta n_k}{E(0) + \frac{\partial E}{\partial n_k}\bigg|_o \Delta n_k} = \frac{1}{E}, \quad (15)$$

from which is calculated:

$$\frac{\partial w_c}{\partial n_k} = \frac{\frac{E(w_c)}{E(0)} \frac{\partial E}{\partial n_k}\bigg|_o - \frac{\partial E}{\partial n_k}\bigg|_{w_c}}{\frac{\partial E}{\partial r}\bigg|_{w_0}} \quad (16)$$

Since the function which is to be minimized, in the form $$\sum_i |n(r_i) - n_o| \cdot r_i \cdot \Delta r \quad (17)$$

it cannot be partially differentiated for $n(r_i) = n_0$ according to $n(r_i)$, the expression is modified as follows:

$$\sum_i |n(r_i) - n_o| \cdot r_i \cdot \Delta r \theta(y_i^2 - 1) + \left( \frac{y_i^2}{2} + \frac{1}{2} \right) n_x \theta(1 - y_i^2) \quad (18)$$

$$y_i = (n(r_i) - n_o)/n_x$$

wherein $n_x$ represents an arbitrarily "small" refractive index limit (approximately $n_x = 0.0001$). The function thus defined is constant over the entire $R^m$ and is differentiable.

Then, a predictor/corrector procedure is used to seek along the direction of the negative projected gradient $$-(I - M^T(MM^T)^{-1}M)g$$

g: Gradient

I: Identität (indentitate = identity) a minimum of the modified summation norm (the algorithm of the "golden section"

algorithm is used for this purpose). This is followed by a step back into the admissible region. This process is terminated if the $L_2$ norm of the projected gradient has become very much smaller than that of the unprojected gradient (i.e., smaller than a corresponding arbitrary limit of about 0.1).

The foregoing is described in greater detail with reference to the accompanying figures.

BRIEF DESCRIPTION OF THE DRAWINGS

Various features are attendant advantages of the present invention will be more fully appreciated as the same becomes better understood when considered in conjunction with the accompanying drawings, wherein.

Figure 1:
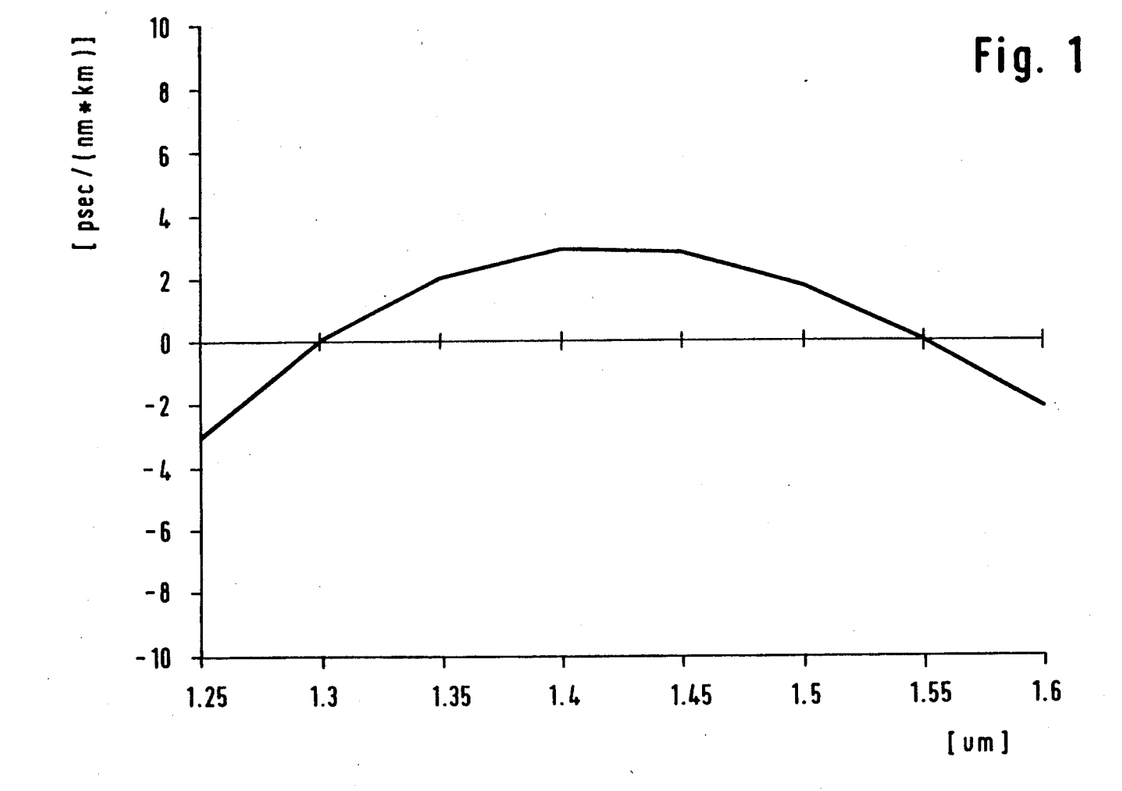
FIG. 1 shows desired values at marked wavelengths of the chromatic dispersion of a fiber. It also illustrates the desired shape of the dispersion curve.
Figure 2:
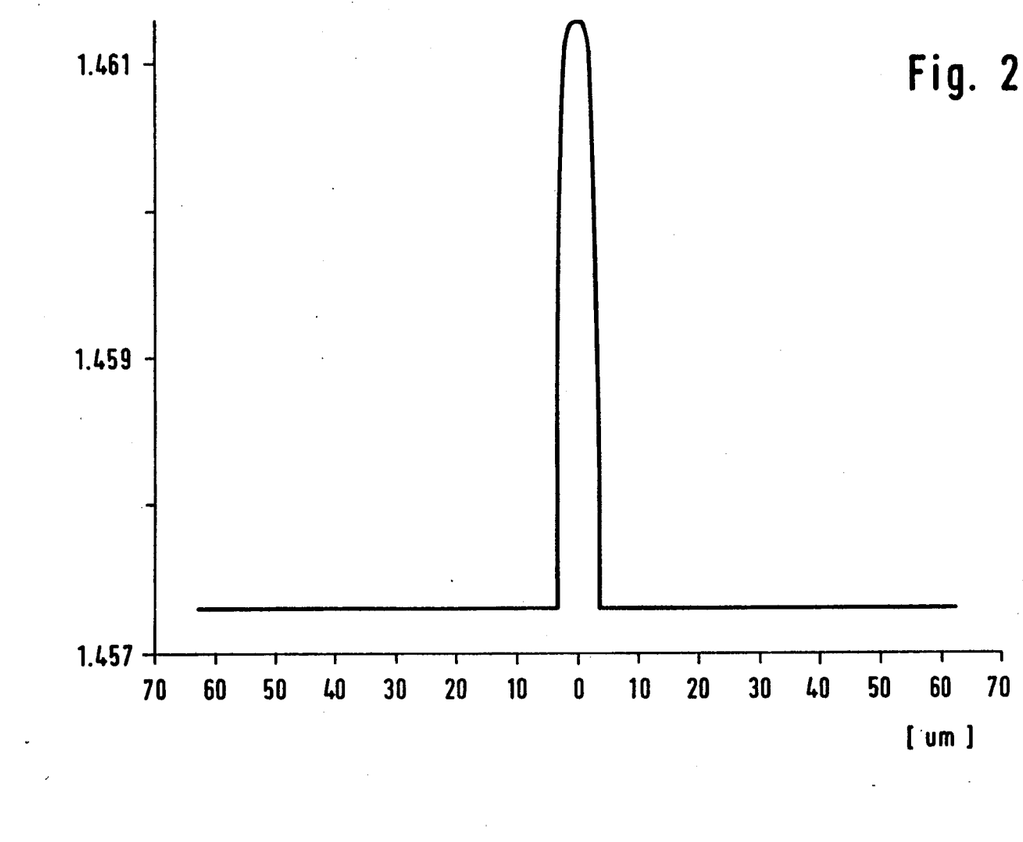
FIG. 2 shows the initial refractive index profile which serves as a basis for the calculations.
Figure 3:
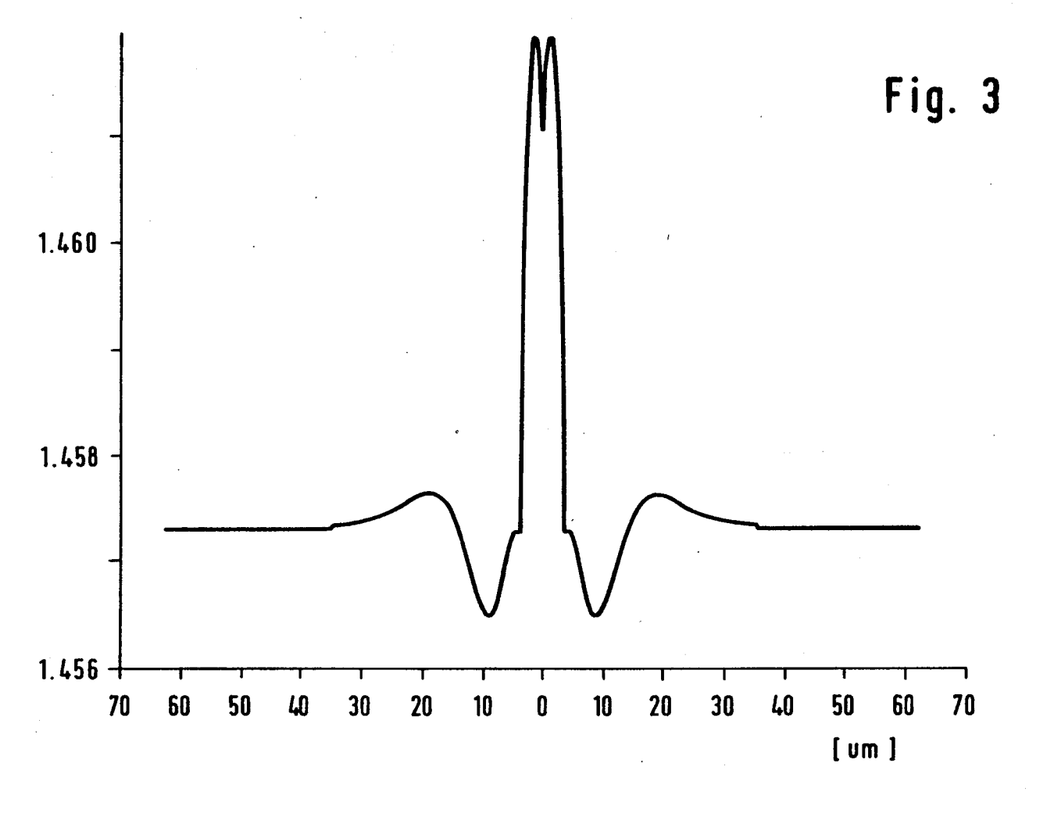
FIG. 3 shows a refractive index profile resulting from a first step in the calculations in the direction of the admissible refractive index region (a region of refractive indices in which the desired properties can be obtained)
Figure 5:
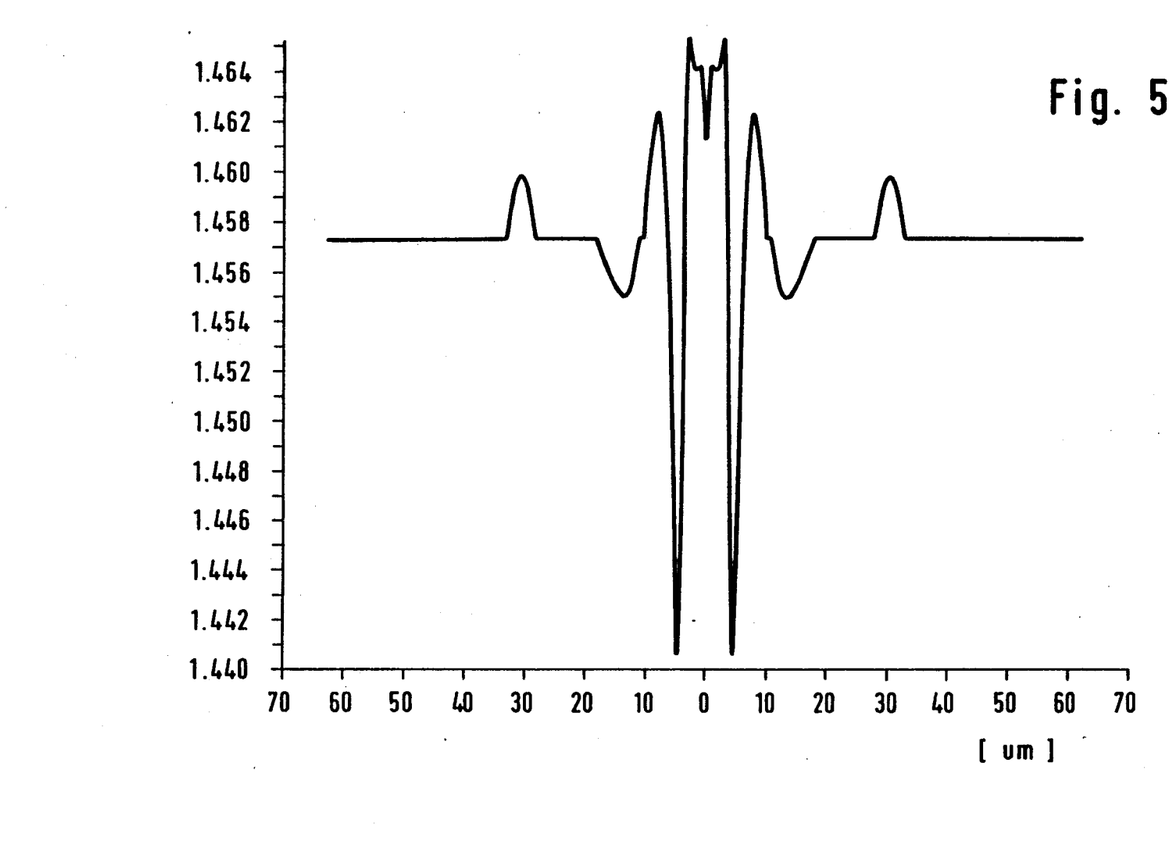
FIGS. 5 and 6 show refractive index profiles after a few (e.g., 5) or many (e.g., 15) approximation steps along the projected gradient in the direction of the minimum.
Figure 6:
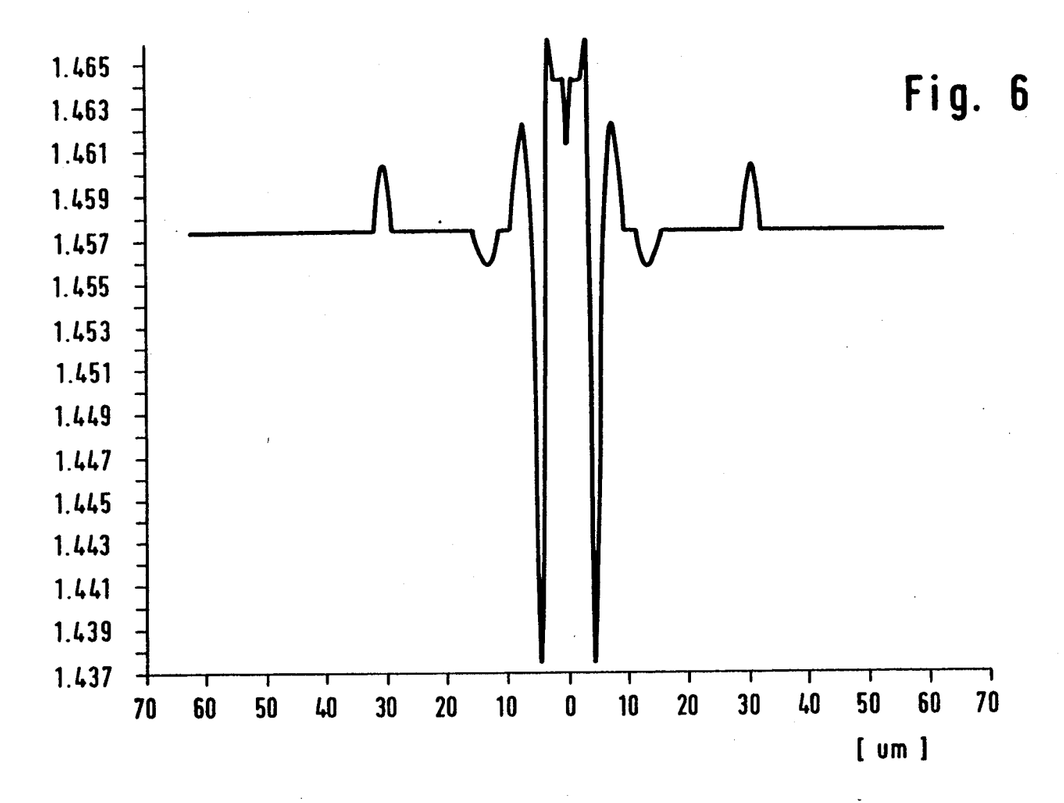

The chromatic dispersion curve shown in FIG. 1 relates to the refractive index profile in FIG. 5. The refractive indices were varied in 1/10 micron distances from zero radius up to a radius of 35 microns.

Figure 7:
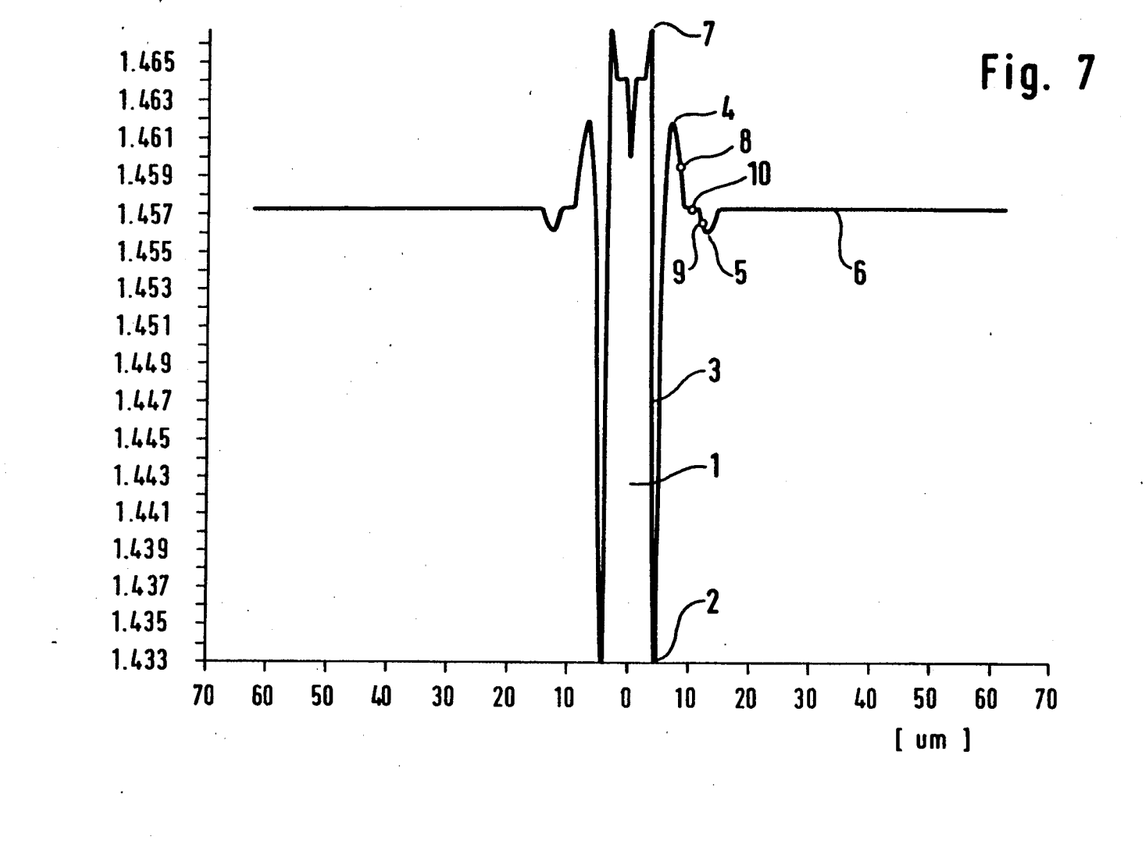
FIG. 7 shows the refractive index profile as finally calculated according to the procedures described herein.

FIG. 7 shows a refractive index profile of a type for a multiclad fiber. This profile has along the fiber radius a characteristic sequence of almost triangular peaks and valleys with intervening flat zones. Coarse structures reappear, i.e., a first strongly defined refractive index minimum 2 following a core 1 of a relatively high refractive index, a defined first refractive index maximum 4, a weak second minimum 5, and a terminal segment 6 (EP-OS-0223282). In comparison with known refractive index profiles (e.g., that of the mentioned EP), the calculated profile exhibits substantial changes.

In simple fibers, i.e., those with a single step in the refractive index profile, the single zero position of the chromatic dispersion can be under 1,300 nm. In known TC (triple-clad) and QC (quadruple-clad) structures, additional refractive index steps bend downwardly the chromatic dispersion curve in the a long wavelength region so that two zero positions on the chromatic dispersion are obtained. In comparison with the simple fiber, the first zero position is shifted to a value above 1,300 nm. If it is desired to have the first zero position at 1,300 nm, the chromatic dispersion at 1,300 nm must be raised to zero. This is achieved in the fiber according to the present invention by providing on the outside edge of core 1 a second maximum 7 of the refractive index, which is connected with a first maximum 2 by a steep descending side 3. In the core, the refractive index rises toward the second maximum 7 by a concave curve.

Figure 4:
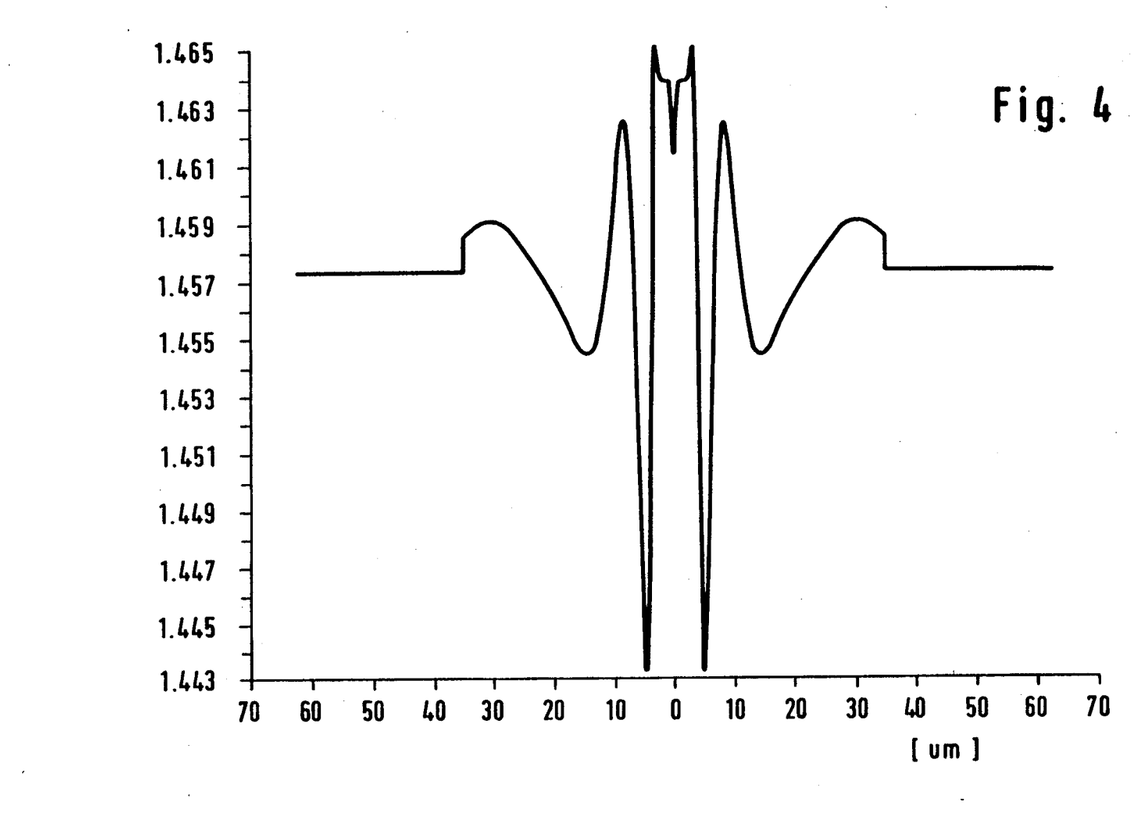
FIG. 4 shows a first refractive index profile in the admissible refractive index region obtained after another calculation step.

In FIG. 4, the gradual descent of the refractive index from the first maximum 4 to a second minimum 5 can be more economically configured if it is accomplished in steps. In this case, a step is put on at the level of the matrix material. Thus, several inflection points shown at 8, 9 and 10 are provided.

Figure 8:
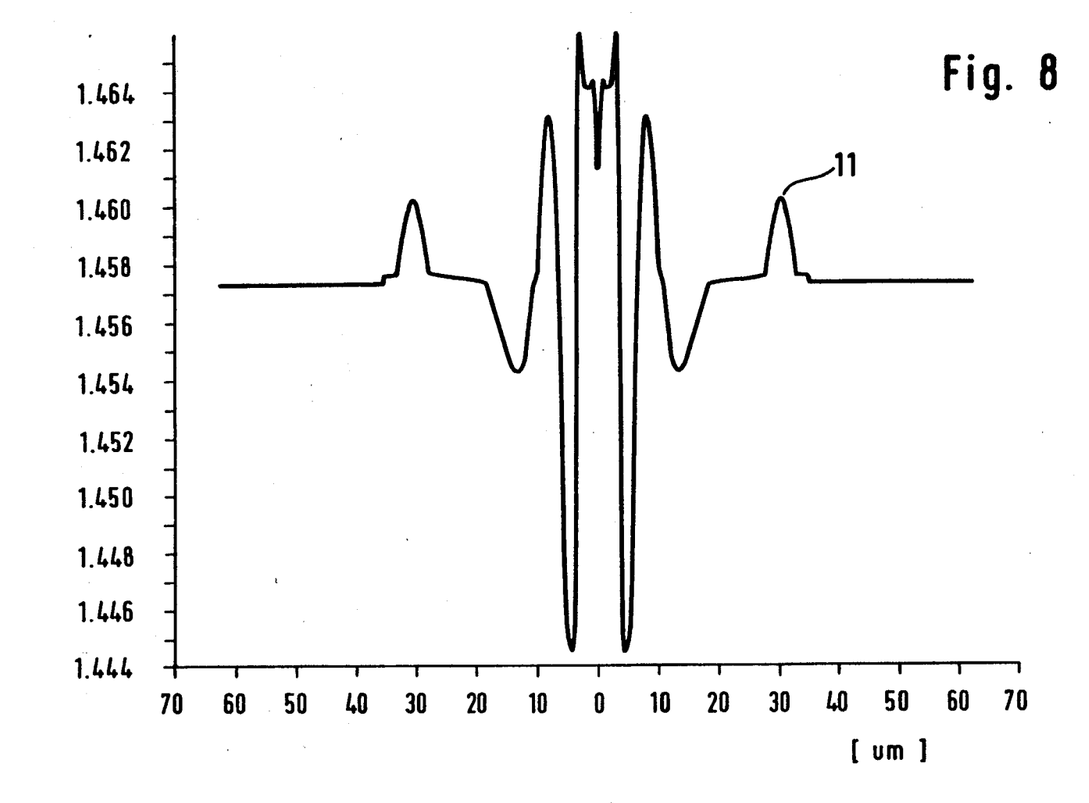
FIG. 8 shows another modified refractive index profile.

As depicted in FIG. 7, the refractive index minimum 2 is relatively low. Since this can cause technical difficulties, it is preferred to introduce in the calculations as one desired property a minimum value of the refractive index as the bottom limit. This can be taken into account by introducing into the above-mentioned norm lower refractive index barriers of the penalty-type function. The calculation then yields an actual refractive index profile which in terminal segment 6 has a third refractive index maximum 11. See FIG. 8. Third maximum 11 causes an increase in the tunneling probability for the $LP_{11}$ photons from the core zone into the material surrounding the fiber, and thus influencing favorably the overmode cutoff, i.e., an increase of the overmode attenuation.

Thus, addition mode field diameters now become possible although they require wide core structures which normally would shift the actual overmode cutoff upwardly beyond 1,300 nm. The third maximum 11 is so far out that it no longer disturbs the fundamental mode (i.e., its attenuation and dispersion). As can be seen in FIG. 4, the third maximum has already set itself early in the calculations performed without establishing a refractive index minimum. But it later disappeared on the way along the projected gradient.

The entire texts of all applications, patents and publications, if any, cited above, and of corresponding application P 38 12 140.9 filed Apr. 12, 1988, in the Federal Republic of Germany, are hereby incorporated by reference, as is the text of the doctoral dissertation of Ulrich Fotheringham (Johannes-Gutenberg University of Mainz) on which this invention is based.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A single-mode multiple-layer fiber with a refractive index profile n(r), in which n means the refractive index of the fiber material at distance r from the axis of the fiber, and the refractive index profile is adjusted by doping of matrix material from which the fiber is predominantly made, with at least one dopant with formation of a number of layers having different refractive indices, characterized in that:

(a) the refractive index profile n(r) is adjusted for preset values of at least one of the desired properties of chromatic dispersion, mode field diameter, attenuation and overmode cutoff;

(b) a number m of layers of thickness $\Delta r$ is greater than the number of desired properties; and (c) each layer contains just enough dopant so that the relative refractive indices, with the desired properties maintained, meet at least approximately the condition $$\sum_{i=1}^{m} |n(r_i) - n_o| \cdot r_i \cdot \Delta r = \text{Minimum}$$

in which $n_o$ means the refractive index of the matrix material and $r_i = i \cdot \Delta r$.

2. A single-mode optical fiber according to claim 1, wherein the matrix material is glass or quartz glass.

3. A single-mode optical fiber according to claim 1, wherein number m of the layers is greater than 100.

4. A single-mode optical fiber according to claim 3, wherein number m of the layers is between 300 and 500.

5. A single-mode optical fiber according to claim 1, wherein a dopant is present to raise the refractive index and a dopant is present to lower the refractive index.

6. A single-mode optical fiber according to claim 1, wherein fluorine and germanium dopants are present.

7. A single-mode optical fiber according to claim 1, wherein the fiber has as a desired property a flattened shape of the chromatic dispersion as a function of the light wavelength.

8. A single-mode optical fiber according to claim 7, wherein the chromatic dispersion has zero positions at the light wavelengths of about 1,300 and 1,550 nm, and a maximum of 3 ps/nm.km about midway between the zero positions.

9. A single-mode optical fiber according to claim 1, wherein as a desired property the attenuation of LP mode, taken at the first overmode, is at least 1 dB/m at 1,250 nm.

10. A single-mode optical fiber according to claim 1, wherein as a desired property the attenuation of fundamental mode ($LP_{10}$) is at most $10^{-6}$ db/km at 1,600 nm.

11. A single-mode optical fiber according to claim 1, wherein as a desired property the mode field diameter is about 1,300 nm.

12. A single-mode optical fiber according to claim 1, wherein as a desired property the refractive index has a minimum value as the bottom limit.

13. An optical fiber according to claim 1, having a refractive index profile shape substantially in accordance with FIG. 7.

14. An optical fiber according to claim 1, having a refractive index profile shape substantially in accordance with FIG. 8.

15. An optical fiber according to claim 13, wherein a step occurs in the refractive index profile at approximately the level of undoped matrix material between first maximum (7) and a second minimum (5).

16. An optical fiber according to claim 4, wherein a third maximum is in the terminal segment of the refractive index profile.

17. A process for the production of a single-mode multiple-layer optical fiber, in which the fiber is designed with multiple layers having different refractive indices, and the refractive index is adjusted by using at least one dopant in the matrix material from which the fiber is predominantly made, characterized in that:
(a) the refractive index profile n(r) is adjusted for preset values of at least one of the desired properties of chromatic dispersion, mode field diameter, attenuation, and overmode cutoff;
(b) the number m of layers of thickness $\Delta r$ is selected large compared with the number of desired properties; and
(c) each layer is provided with just enough so that the relative refractive indices while maintaining the desired properties meets approximately the condition $$\sum_{i=1}^{m} |n(r_i) - n_o| \cdot r_i \cdot \Delta r = \text{Minimum}$$

in which $n_o$ means the refractive index of the matrix material and $r_i = i \cdot \Delta r$.

18. A process according to claim 17, wherein more than 100 layers are selected.

19. A process according to claim 17, wherein about 300 to 500 layers are selected.

* * * * *